US 12,040,728 B2

(12) United States Patent
Bartl et al.

(10) Patent No.: US 12,040,728 B2
(45) Date of Patent: Jul. 16, 2024

(54) ADAPTED SWITCHING SIGNAL FOR A MOTOR

(71) Applicant: Infineon Technologies AG, Neubiberg (DE)

(72) Inventors: Christian Bartl, Rudolstadt (DE); Stefan Golisch, Erfurt (DE); Michael Brückner, Illmenau (DE); Sandro Purfürst, Illmenau (DE)

(73) Assignee: Infineon Technologies AG, Neubiberg (DE)

( * ) Notice: Subject to any disclaimer, the term of this patent is extended or adjusted under 35 U.S.C. 154(b) by 155 days.

(21) Appl. No.: 17/820,503

(22) Filed: Aug. 17, 2022

(65) Prior Publication Data
US 2024/0063741 A1 Feb. 22, 2024

(51) Int. Cl.
*H02P 23/14* (2006.01)
*H02P 27/08* (2006.01)

(52) U.S. Cl.
CPC .............. *H02P 23/14* (2013.01); *H02P 27/08* (2013.01)

(58) Field of Classification Search
CPC ................................ H02P 23/14; H02P 27/08
USPC ........ 318/494, 801, 800, 799, 798, 767, 727
See application file for complete search history.

(56) References Cited

U.S. PATENT DOCUMENTS 10,320,323 B1* 6/2019 Wu ..................... H02M 7/5395

OTHER PUBLICATIONS

Torres et al., "Single-Shunt Three-Phase Current Reconstruction Algorithm for Sensorless FOC of a PMSM", Microchip, 2009, 24 pp., (Applicant points out, in accordance with MPEP 609.04 (a), that the year of publication, 2009, is sufficiently earlier than the effective U.S. filing date, so that the particular month of publication is not an issue.).

* cited by examiner

*Primary Examiner* — David Luo
(74) *Attorney, Agent, or Firm* — Shumaker & Sieffert, P.A.

(57) ABSTRACT

A circuit is configured to generate a first switching signal and a second switching signal. During a first portion of a first switching period, both the first switching signal and the second switching signal indicate to turn-on and turn-off. During a second portion of the first switching period, the first switching signal indicates to turn-on and the second switching signal indicates to turn-off. In response to a determination that a measurement time threshold exceeds the first switching period, the circuit is configured to generate a first adapted switching signal that extends the turn-on portion by a time value in the first switching period and to generate a second adapted switching signal that extends the turn-on time by the time value in a second switching period. The circuit is further configured to control switching circuitry using the first adapted switching signal and the second adapted switching signal to operate a motor.

20 Claims, 14 Drawing Sheets

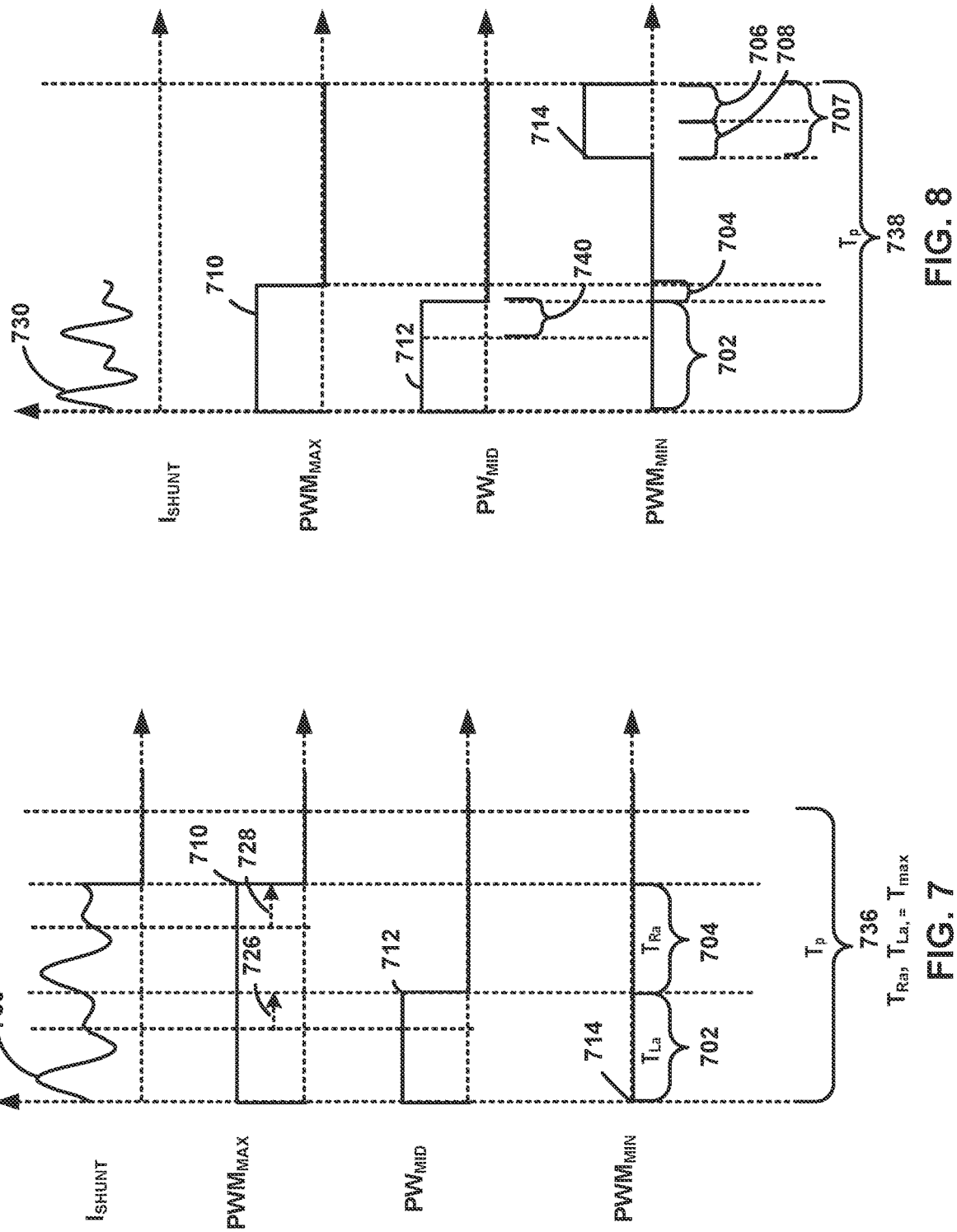

ADAPTED SWITCHING SIGNAL FOR A MOTOR

TECHNICAL FIELD

This disclosure relates to circuits and techniques for generating a switching signal, and more specifically, circuits and techniques for generating a switching signal associated with operating or controlling an electric motor.

BACKGROUND

Operation of a motor may be performed by a controller. The controller controls a rotor rotation of the motor based on a position of the rotor relative to stator coils of the motor. For example, the controller may control inverter circuitry to provide power from a voltage rail to each phase of the motor based on the rotor position to provide a desired rotor speed and/or torque. To accurately control the inverter circuitry, a measurement circuit may measure phase voltages and/or phase currents of the motor.

SUMMARY

In general, this disclosure is directed to techniques for generating adapted switching signals for controlling operating a motor (e.g., a three-phase electrical motor) while ensuring and/or improving an accuracy of voltage and/or current measurements of phases of the motor. For example, a controller may generate a first switching signal and a second switching signal (e.g., based on a position of a rotor of the motor). For instance, during a first portion of the first switching period, both the first switching signal and the second switching signal may indicate to turn-on. During a second portion of the first switching period, the first switching signal may indicate to turn-on and the second switching signal may indicate to turn-off. In response to a determination that a measurement time threshold exceeds the second portion of the first switching period, the controller may generate a first adapted switching signal that extends the second portion of a first switching period by a time value. In this example, the controller may generate a second adapted switching signal that extends the first portion by the time value in a second switching period. In this way, the controller may generate an adapted switching signal that extends the time (e.g. a measurement window) of a portion of the adapted switching signal, which may allow a measurement circuit (e.g., an analog-to-digital converter) to sample a voltage or current for the motor and/or allow time for the voltage or current to settle (e.g., from switching of switching circuitry operating the motor).

Moreover, adapting and compensating the switching signals using two switching periods may simplify hardware and/or reduce a switching burden. For example, generating the first adapted switching signal that extends the second portion of the first switching period and generating the second adapted switching signal that extends the first portion in the second switching period may allow for the measurement circuit to sample a voltage or current for the motor and/or allow time for the voltage or current to settle without relying on a switching signal to switch on and off twice during a single switching period.

In one example, the disclosure describes a circuit for controlling a motor. The circuit is configured to generate a first switching signal and a second switching signal. During a first portion of a first switching period, both the first switching signal and the second switching signal indicate to turn-on. During a second portion of the first switching period, the first switching signal indicates to turn-on and the second switching signal indicates to turn-off. In response to a determination that a measurement time threshold exceeds the second portion of the first switching period, the circuit is configured to generate a first adapted switching signal that extends the second portion of the first switching signal by a time value in the first switching period and generate a second adapted switching signal that extends the first portion of the second switching signal by the time value in a second switching period that occurs after the first switching period. The circuit is further configured to control switching circuitry using the first adapted switching signal and the second adapted switching signal to operate the motor.

In another example, this disclosure describes a method for controlling a motor including generating a first switching signal and a second switching signal. During a first portion of a first switching period the first switching signal and the second switching signal indicate to turn-on. During a second portion of the first switching period, the first switching signal indicates to turn-on and the second switching signal indicates to turn-off. In response to determining that a measurement time threshold exceeds the second portion of the first switching period, the method further includes generating a first adapted switching signal that extends the second portion of the first switching signal by a time value in the first switching period and generating a second adapted switching signal that extends the first portion of the second switching signal by the time value in a second switching period that occurs after the first switching period. The method further includes controlling switching circuitry using the first adapted switching signal and the second adapted switching signal to operate the motor.

In one example, this disclosure describes a system for controlling a motor including switching circuitry and a controller implemented in circuitry. The controller is configured to generate a first switching signal and a second switching signal. During a first portion of a first switching period, both the first switching signal and the second switching signal indicate to turn-on. During a second portion of the first switching period, the first switching signal indicates to turn-on and the second switching signal indicates to turn-off. In response to a determination that a measurement time threshold exceeds the second portion of the first switching period, the controller is configured to generate a first adapted switching signal that extends the second portion of the first switching signal by a time value in the first switching period and generate a second adapted switching signal that extends the first portion of the second switching signal by the time value in a second switching period that occurs after the first switching period. The controller is further configured to control switching circuitry using the first adapted switching signal and the second adapted switching signal to operate the motor.

Details of these and other examples are set forth in the accompanying drawings and the description below. Other features, objects, and advantages will be apparent from the description and drawings, and from the claims.

BRIEF DESCRIPTION OF DRAWINGS

FIG. 7 is a conceptual timing diagram illustrating an example of a first adapted switching signal, a second adapted switching signal, and a third adapted switching signal using two switching periods, in accordance with one or more techniques of this disclosure.

FIG. 8 is a conceptual timing diagram illustrating an example of a first adapted switching signal, a second adapted switching signal, and a third adapted switching signal during a second switching period that has been adapted over two switching periods, in accordance with one or more techniques of this disclosure.

DETAILED DESCRIPTION

This disclosure is directed to circuits, systems, and techniques for generating a switching signal for operating a motor circuit (e.g., inverter circuitry) to operate (e.g., drive or control) a voltage for operating a motor. For example, to operate a 3-phase brushless direct current motor (BLDC) with filed-oriented control, a measurement of the phase current may be performed. Some measurement circuits may determine phase currents using a single shunt measurement. For example, a measurement circuit may use an analog-to-digital converter (ADC) to take discrete current measurements at a resistive shunt. However, the ADC may be limited by a sampling rate at which the ADC is capable of taking measurements. As such, the ADC may not be capable of measuring portions of the phase current that are less than a minimum measurement time window (e.g., a dead zone). Further, voltage and/or current transients may occur at the motor. As such, the ADC may not accurately measure a voltage and/or current at the motor until a settling time.

Techniques described herein may include generating adapted switching signals with extended portions to facilitate a measurement circuit and/or improve an accuracy of the measurement. The use of adapted switching signals with extended portions (e.g., in BLDC motor control applications with a single shunt current measurement circuit) may help a controller reduce or even eliminate dead zones in which the phase current cannot be measured compared systems that do not use adapted switching signals. Moreover, the use of adapted switching signals with extended portions may help to allow more time for a current at the resistive shunt to settle, which may improve an accuracy of the voltage measurement compared to systems that do not use adapted switching signals.

Figure 1:
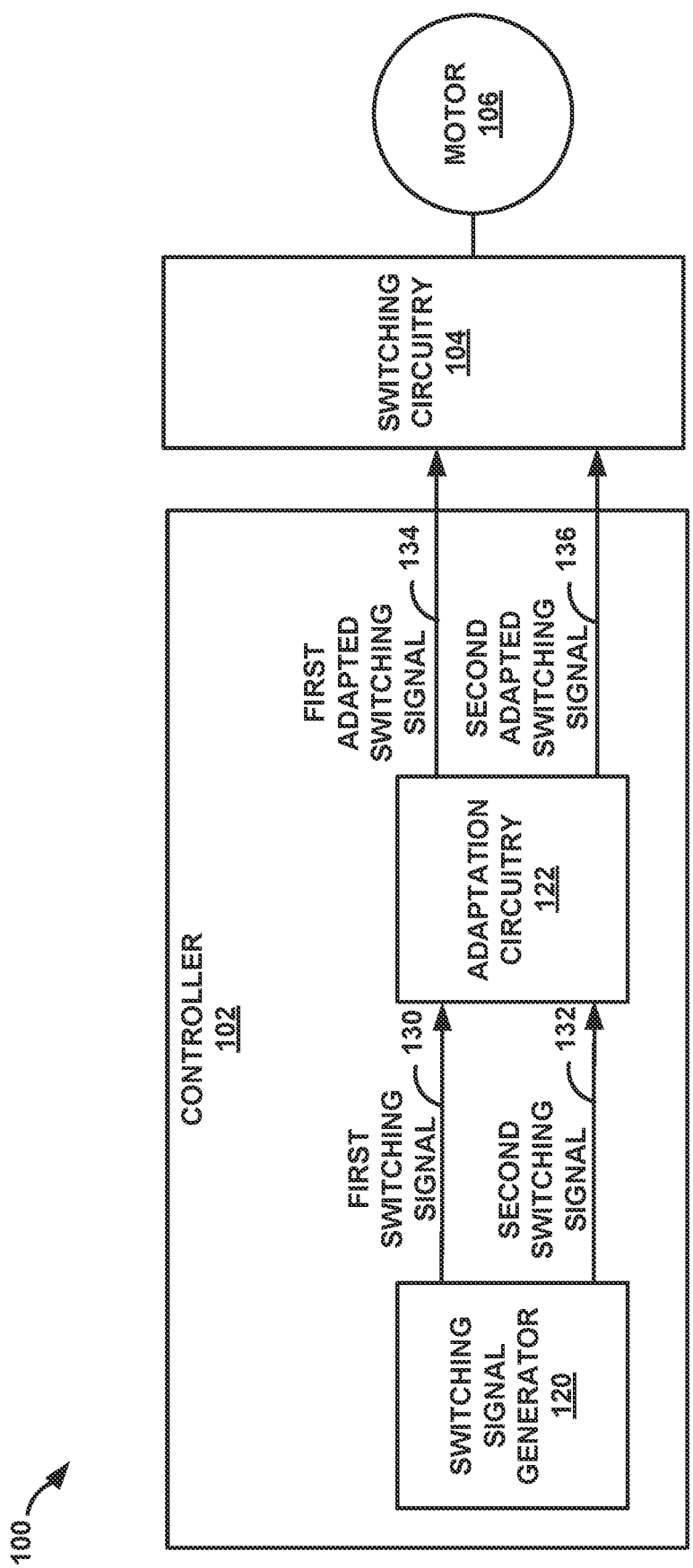
FIG. 1 is a block diagram illustrating an example system for controlling a motor, in accordance with one or more techniques of this disclosure.

FIG. 1 is a block diagram illustrating an example system 100 for controlling a motor 106, in accordance with one or more techniques of this disclosure. As illustrated in the example of FIG. 1, system 100 may include a controller 102, switching circuitry 104, and a motor 106. Controller 102 may include a switching signal generator 120 and an adaptation circuitry 122.

Switching signal generator 120 may generate first switching signal 130 and second switching signal 132 for operating motor 106. For instance, switching signal generator 120 may apply field-oriented control to generate first switching signal 130 and second switching signal 132 based on a position of a rotor of motor 106. While the example of FIG. 1 includes only two switching signals, some examples may include more than two switching signals. For example, switching signal generator 120 may optionally generate a third switching signal.

Adaptation circuitry 122 may generate a first adapted switching signal 134 that extends a portion of first switching signal 130 by a time value in the first switching period. Similarly, adaptation circuitry 122 may generate a second adapted switching signal 136 that extends a portion of the second switching signal 132 by the time value in a second switching period that occurs after the first switching period. As shown, adaptation circuitry 122 may be part of controller 102. However, in some examples, adaptation circuitry 122 may be separate from controller 102.

Switching circuitry 104 may be configured to operate (e.g., drive or control) motor 106 based on a first adapted switching signal 134 and a second adapted switching signal 136. In some examples, switching circuitry 104 may be configured to provide power from a supply to motor 106. In some examples, switching circuitry 104 may be configured to sink power from motor 106 to a supply (e.g., a battery, another motor, or capacitor). Switching circuitry 104 may be controlled by first adapted switching signal 134 and second adapted switching signal 136. Switching circuitry 104 may include a voltage source inverter (VSI). In some examples, switching circuitry 104 may include one or more switching elements controlled based on first adapted switching signal 134 and second adapted switching signal 136. For example, switching circuitry 104 may include a first switching element controlled by first adapted switching signal 134 and a second switching element controlled by second adapted switching signal 136. In some examples, switching circuitry 104 may be included in the controller 102.

Motor 106 may include, for example, a brushless direct current motor (BLDC). Motor 106 may operate as only a load to convert electrical energy into mechanical energy, only a generator to convert mechanical energy into electrical energy, or both a load or a generator. For example, controller 102 may be configured to operate motor 106 as a load and/or a generator. In some examples, controller 102 may be configured to drive motor 106 as only a load. Controller 102 may be configured to control motor 106 as only a generator.

Controller 102 may include one or more processors, such as one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

In accordance with the techniques of the disclosure, switching signal generator 120 may generate first switching signal 130 and second switching signal 132. In some examples, a during first portion of first switching period 130, first switching signal 130 and second switching signal 132 may indicate to turn-on. During a second portion of first the switching period, first switching signal 130 may indicate to turn-on and second switching signal 132 may indicate to turn-off.

Controller 102 may determine that a measurement time threshold exceeds the second portion of the first switching period. The measurement time may include a preconfigured measurement time threshold representing one or more of a sampling time of a measurement circuit or a settling time for shunt current for motor 106. In some examples, the measurement time may include a determined measurement time threshold representing one or more of a sampling time of a measurement circuit or a settling time for shunt current for motor 106.

In response to a determination that a measurement time threshold exceeds the second portion of the first switching period, adaptation circuitry 122 may generate a first adapted switching signal 134 that extends the second portion by a time value in the first switching period. In this example, adaptation circuitry 122 may generate a second adapted switching signal 136 that extends the first portion by the time value in a second switching period that occurs after the first switching period. Controller 102 may control switching circuitry 104 using first adapted switching signal 134 and second adapted switching signal 136 to operate the motor 106. For example, controller 102 may output first adapted switching signal 134 and second adapted switching signal 136 to control switching elements of switching circuitry 104.

In some examples, limitations may be mitigated by adapting portions of the switching signal. Adapting the switching signal may include extending portions of the switching signal for which an initial measurement was inaccurate. The adaption of space vector modulation (SVM) modulation schemes extends the underlaying pulse width modulation (PWM) patterns in a such way that the measurement windows may be wide enough to sample two current values in one switching (e.g., PWM) period. Some systems may perform the compensation of these adaptions in the same switching period to prevent from distortions of the motor control caused by additionally used voltage space vectors for the measurement window adaption. In some examples, techniques described herein may perform adaption and compensation in multiple (e.g., two) switching periods. In this way, techniques described herein may be used in controllers that lack a capability to switch a switching signal on and off twice in one switching period.

Figure 2:
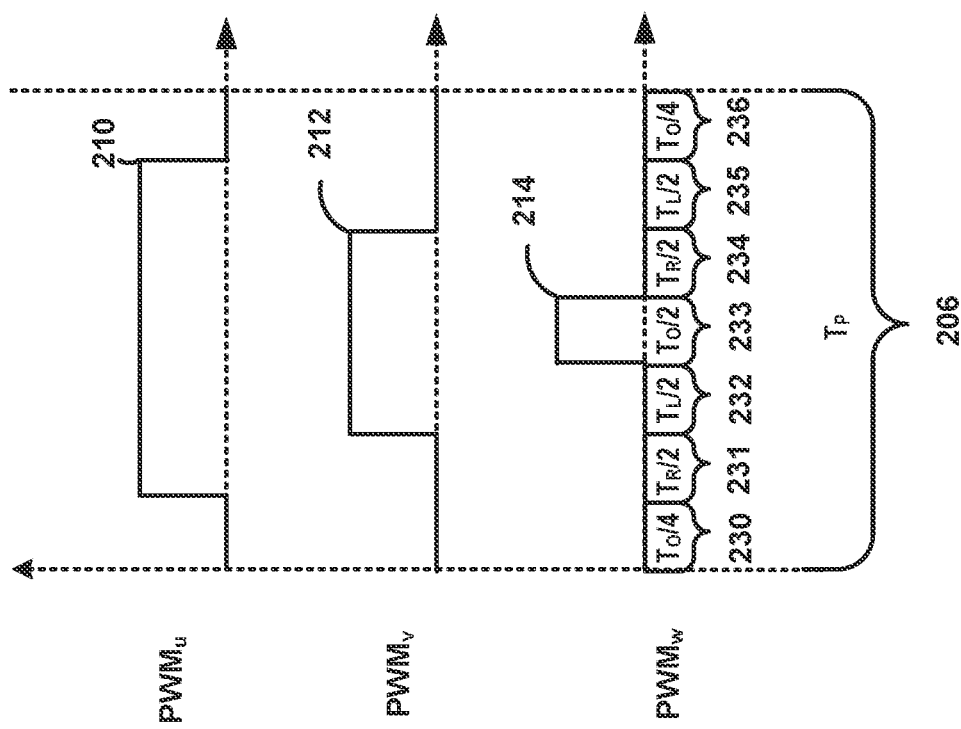
FIG. 2 illustrates a conceptual timing diagram illustrating an example of a center aligned modulation control pattern, in accordance with one or more techniques of this disclosure.

FIG. 2 illustrates a conceptual timing diagram illustrating an example of a center aligned modulation control pattern, in accordance with one or more techniques of this disclosure. In the example of FIG. 2, the abscissa axis represent time and the ordinate axis of the center aligned modulation pattern represents a first switching signal 210, a second switching signal 212, and a third switching signal 214. As shown, switching period 206 ($T_p$) includes portions 230-236. In center aligned modulation control pattern of FIG. 2 (e.g., a 3-phase center aligned pattern), each one of first switching signal 210, second switching signal 212, and third switching signal 214 is turned-on during portion 233 (e.g., a center of switching period 206). As shown, second switching signal 212 is turned-on during portions 232-234. In this example, first switching signal 210 is turned-on during portions 231-235.

Figure 3:
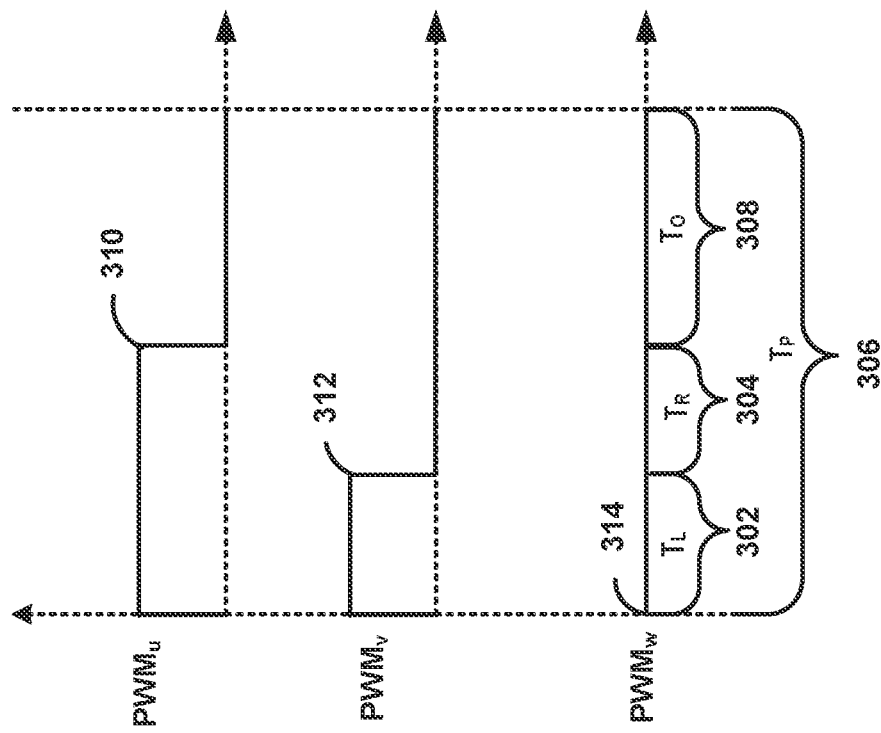
FIG. 3 illustrates a conceptual timing diagram illustrating an example of an edge aligned modulation control pattern, in accordance with one or more techniques of this disclosure.

FIG. 3 illustrates a conceptual timing diagram illustrating an example of an edge aligned modulation control pattern, in accordance with one or more techniques of this disclosure. In the example of FIG. 3, the abscissa axis represent time and the ordinate axis of the center aligned modulation pattern represents a first switching signal 310, a second switching signal 312, and a third switching signal 314. As shown, switching period 306 includes portions 302, 304, and 308. In the edge aligned modulation control pattern of FIG. 3 (e.g., a 2-phase edge aligned pattern), each one of first switching signal 310 and second switching signal 312 (e.g., 2 phases) is turned-on during portion 302 ($T_L$). As shown, second switching signal 312 is turned-on during portion 302 ($T_R$) and 304 ($T_O$). In this example, third switching signal 314 is turned-off during first switching period 306.

In the example of FIGS. 2, 3, first switching signals 210, 310, second switching signals 212, 312, and third switching signals 214, 314, may be square wave voltage signals that are PWM signals. In some examples of FIGS. 2, 3, a unique duty cycle may be selected for each of the three switching signals in the first switching period. A duty cycle may represent a percentage, indicating an amount of time a switching signal indicates to turn-on divided by the duration of the signal period. Using the edge aligned modulation control pattern of FIG. 3 may help to reduce switching losses compared to using the center aligned modulation pattern of FIG. 2. Edge aligned modulation may help to reduce the complexity compared to using a center aligned modulation pattern. Hardware implementation requirements may be reduced by using an edge aligned modulation pattern as compared to a center aligned modulation pattern, which may help to reduce a cost of controller 102 and/or switching circuitry 104. In some examples, using the edge aligned modulation pattern may result in increased harmonics on phase currents compared to the center aligned modulation pattern, which may result in increased torque ripples.

Figure 4:
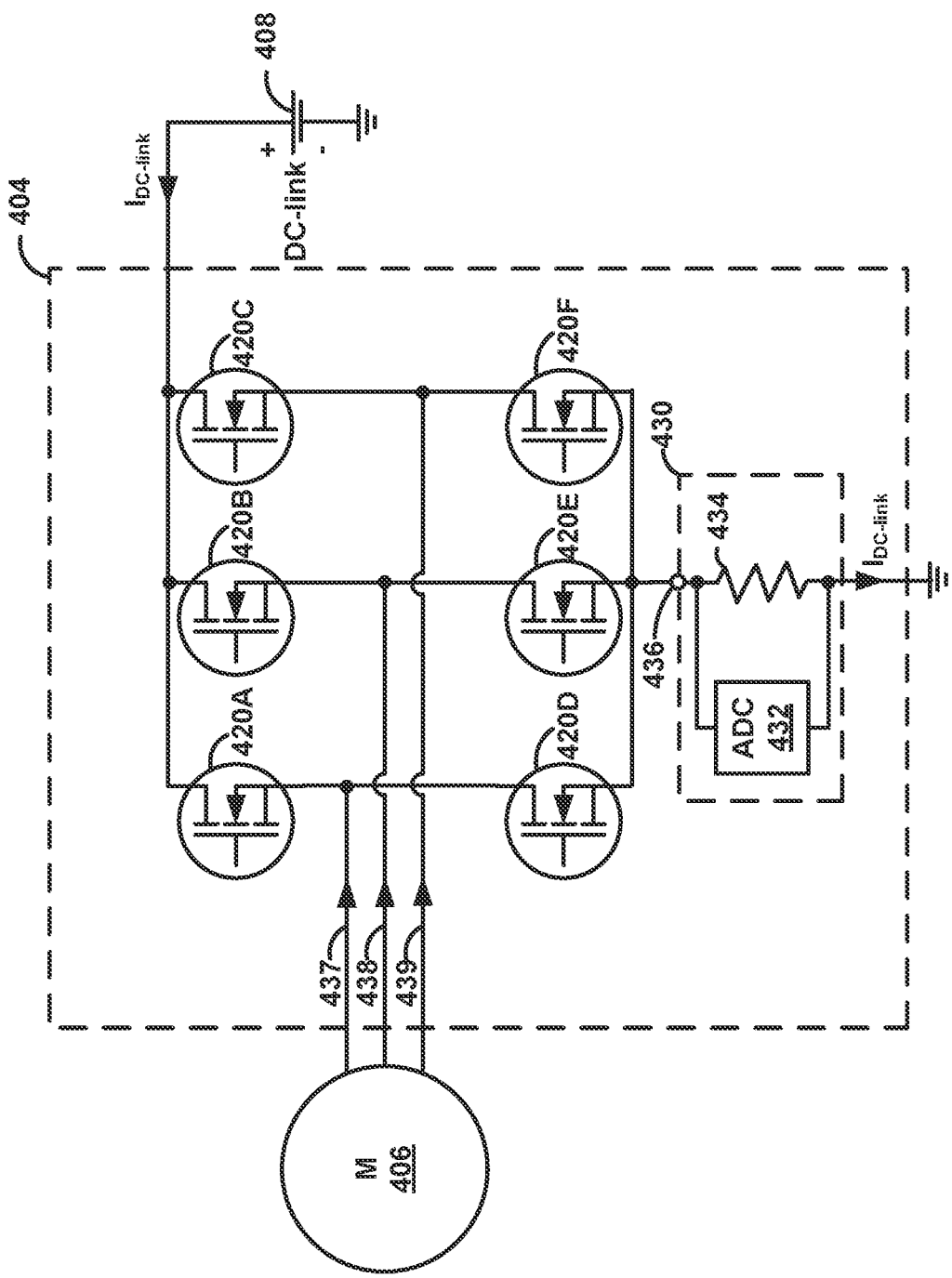
FIG. 4 is a conceptual schematic illustrating an example of switching circuitry controlled using switching signals.

FIG. 4 is a conceptual schematic illustrating an example of switching circuitry controlled using switching signals. Switching circuitry 404 is an example of switching circuitry 104 of FIG. 1. In the example of FIG. 4, switching elements 420A-420F of switching circuitry 404 may be controlled using first adapted switching signal 134 and second adapted switching signal 134 of FIG. 1 and a third adapted switching signal. Switching circuitry 404 may control a current path (e.g. IDC-link) through switching elements 420A-420F.

Switching elements 420A-420C may connect a first side (e.g., a positive terminal) of a supply 408 (e.g. a DC-link) to motor 406. Examples of supply 408 may include a direct current (DC) voltage supply supplying a fixed voltage over time. In some examples, supply 408 may be a DC current supply supplying a fixed current over time. Switching elements 420D-420F may connect motor 406 (e.g. operating as a load and/or a generator) to a second side (e.g., a negative terminal) of supply 408. Measurement circuit 430 may measure a voltage drop from a measurement circuit input port 436 of measurement circuit 430 to a reference node (e.g., an earth ground or a voltage reference). The voltage drop may be referred to herein as a voltage response when switching signals are applied. The voltage drop may be generated from the current (e.g. $I_{DC\_link}$) through a resistive shunt 434. Measurement circuit 430 may be used to measure the resulting voltage response from current routed through a combination of switching elements 420A-420F into measurement circuit input port 436.

In the example of FIG. 4, switching elements 420A-420F may include a variety of electrically operated switches. Examples of switches may include diodes or transistors. Examples of diodes may include a junction diode, a Zener diode, a tunnel diode, a Schottky diode, a varactor diode, a rectifier diodes, a pn-diode, or a nonlinear voltage-current devices operated as a diode. Examples of transistors may include an n-type field-effect transistors (FETs), a p-type field-effect transistors (FETs) metal-oxide-semiconductor field-effect transistors (MOSFETs), a bipolar junction transistors (BJTs), or an insulated-gate bipolar transistors (IGBTs).

An analog-to-digital converter (ADC) 432 may be configured to measure a voltage drop resulting from current generated by phase currents 437, 438, 439. Abrupt voltage transmissions may occur when control circuitry 404 switches between two different active switch states. The abrupt voltage change may result in a transient voltage response. Such a transient voltage response may require a settling time duration in order for the voltage value to settle. ADC 432 may use a settled voltage value as a measured value, which may result in more accurate approximation compared to systems that do not include a settling time duration.

Phase current measurements generated by measurement circuit 430 may be used to control motor 406 using field-oriented control. In single shunt applications, controller 102 may perform an adjustment of the SVM scheme applied to motor 406 to adapt measurement windows that are too short in duration to accommodate a measurement using measurement circuit 430.

Figure 5:
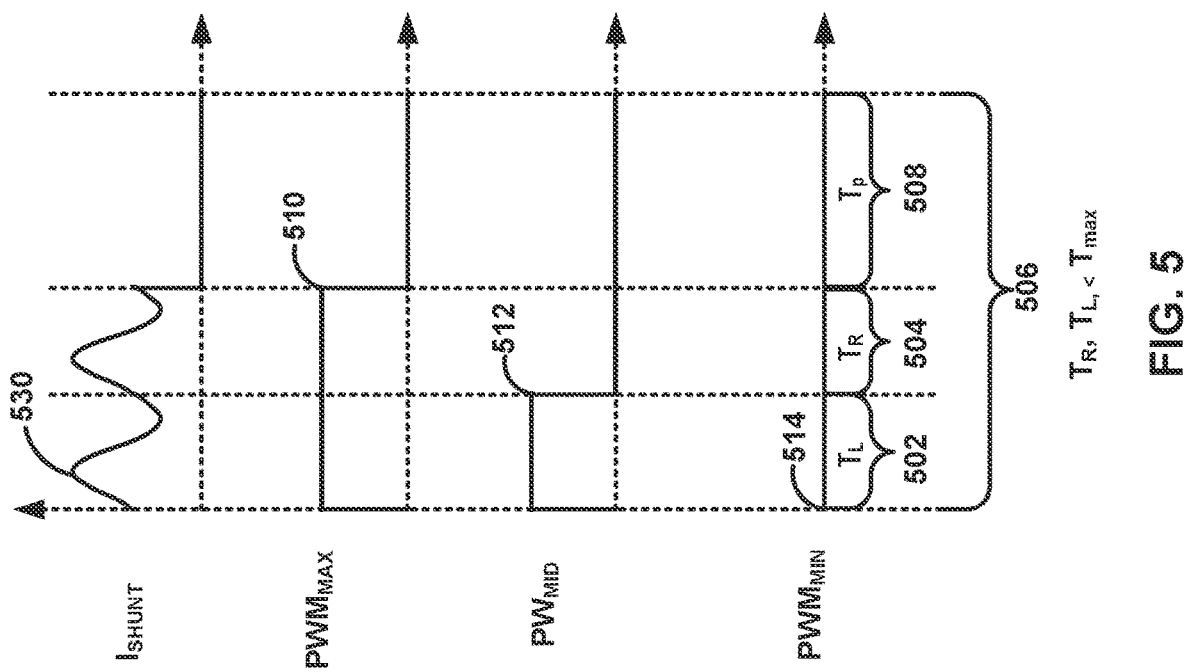
FIG. 5 is a conceptual timing diagram illustrating an example of a first switching signal, a second switching signal, and a third switching signal, in accordance with one or more techniques of the disclosure.

FIG. 5 is a conceptual timing diagram illustrating an example of a first switching signal 510, a second switching signal 512, and third switching signal 514, in accordance with one or more techniques of the disclosure. The abscissa axes of FIG. 5, represents time and the ordinate axis of FIG. 5 represents first switching signal 510, second switching signal 512, third switching signal 514, and shunt current 530 (e.g., a voltage measured at resistive shunt 434). Switching period 506 includes portion 502 ($T_L$), portion 504 ($T_R$), and portion 508 ($T_P$).

As shown, each one of first switching signal 510 and second switching signal 512 is turned-on during portion 502 ($T_L$). Second switching signal 312 is turned-on during portion 502 ($T_R$) and 504 ($T_O$). In this example, third switching signal 514 is turned-off during first switching period 506.

Measurement circuit 430 may be used to measure the current or voltage at resistive shunt 434. A sampling time may represent a minimum time period for which ADC 432 may measure a voltage or current at resistive shunt 434. If the sampling time is longer than a portion of the switching signal, ADC 432 may not accurately measure the voltage and/or current at resistive shunt 434. If the measurement circuit takes an inaccurate measurement, instability in controlling motor 406 may occur.

Extending a portion of the switching signal may increase the amount of time for which ADC 432 may take a measurement (e.g. a time window). Increasing the amount of time available for the measurement circuit to measure a voltage and/or current response signal increases the amount of time the response signal has to settle. To maintain consistent performance of motor 406, additional adaptations may be implemented to compensate the effects introduced from the initial adaptations. In this way, a controller (e.g., controller 102 of FIG. 1) may adapt a switching signal for measurement while maintaining consistent motor performance.

FIG. 5 illustrates an example of a 2-phase edge aligned SVM pattern in which first portion 502 of first switching period 506, and second portion 504 of first switching period 506 (e.g. measurement windows [$T_R$, $T_L$]) in first switching period 506 (e.g one switching period [$T_R$]) are too small to sample (e.g., $T_R$, $T_L$, <$T_{max}$) with ADC 432 of FIG. 4. First portion 502 and/or second portion 504 may be too small for ADC 432 to sample within a minimum ADC sampling time of ADC 432. Techniques described herein for using an adapted switching signal may help to ensure that ADC 432 may sample a value considering a theoretical maximum measurement window width.

Figure 6:
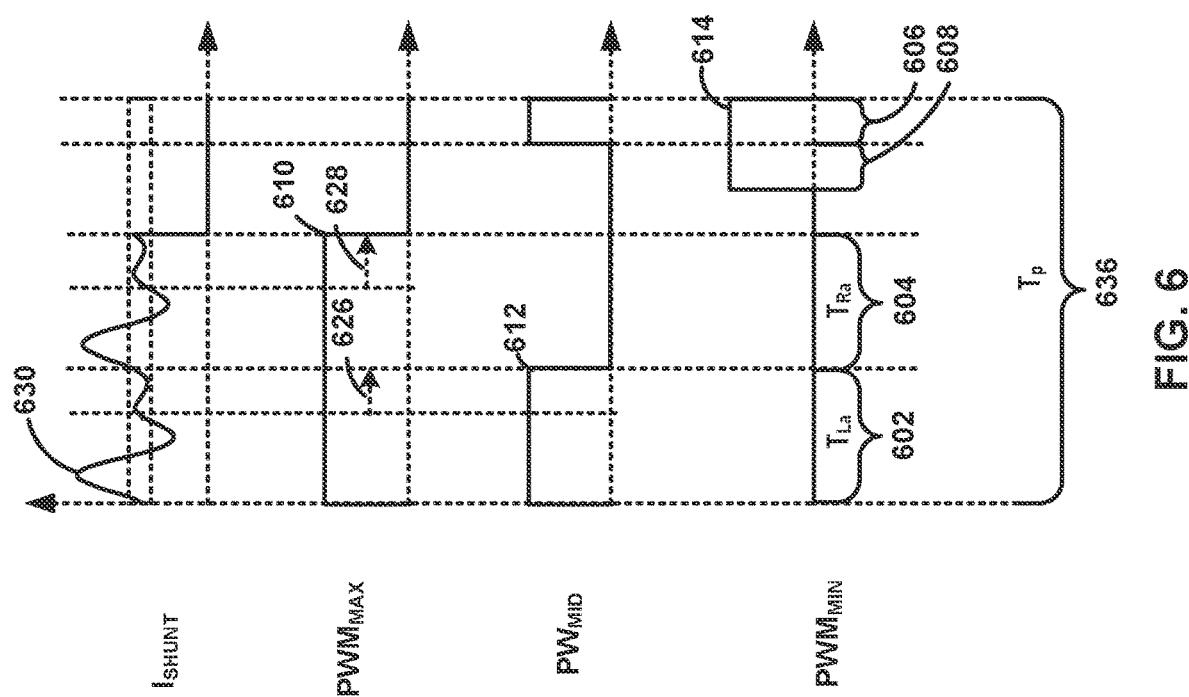
FIG. 6 is a conceptual timing diagram illustrating an example of adapted switching signals using a single switching period, in accordance with one or more techniques of the disclosure.

FIG. 6 is a conceptual timing diagram illustrating an example of adapted switching signals using a single switching period 636, in accordance with one or more techniques of the disclosure. The abscissa axes of FIG. 6 represent time and the ordinate axis of FIG. 6 represents first adapted switching signal 610, second adapted switching signal 612, third adapted switching signal 614, and shunt current 630. Switching period 636 includes portion 602 ($T_{La}$), portion 604 ($T_{Ra}$), and portion 508 ($T_P$).

In the example of FIG. 6 controller 102 may determine adapted switching signals 710-714 based on switching signals 510-514 of FIG. 5. For example, each one of first adapted switching signal 610 and second adapted switching signal 612 may be turned-on during portion 602 ($T_{La}$), which is extended from portion 502 ($T_L$) of FIG. 5 by time value 626. First adapted switching signal 610 may be further turned-on during portion 604 ($T_{Ra}$), which is extended from portion 504 ($T_R$) of FIG. 5 by time value 628. Time value 628 may be equal to time value 626. Moreover, second adapted switching signal 612 may be turned-on during first compensated portion 606. In this example, third adapted switching signal 614 may be turned-on during first compensated portion 606 and a second compensated portion 608. As shown, first compensated portion 606 may extend a time value corresponding to (e.g., equal to) time value 626 and/or time value 628. Similarly, second compensated portion 608 may extend a time value corresponding to (e.g., equal to) time value 626 and/or time value 628.

In the example of FIG. 6, controller 102 may determine that first portion 502 (e.g., $T_L$) of FIG. 5 is too small and generate first adapted switching signal 610 with first portion 602 (e.g., $T_{La}$) that is adapted to a maximum measurement window ($T_{max}$). The compensated time may be represented by $T_{La}$-$T_L$. In this example, controller 102 may determine that second portion 504 (e.g., $T_R$) of FIG. 5 is too small and generate first adapted switching signal 610 with an adapted second portion 604 (e.g., $T_{Ra}$) that is adapted to the maximum measurement window ($T_{max}$). The compensated time may be represented by $T_{Ra}$-$T_R$. However, performing measurement window adaptation in a single switching cycle may exceed a functional range of capture compare units in cost sensitive applications, for example, when using asynchronous PWM switching and/or when switching PWM on and off twice per PWM period.

FIG. 7 is a conceptual timing diagram illustrating an example of a first adapted switching signal 710, a second adapted switching signal 712, and a third adapted switching signal 714 using two switching periods, in accordance with one or more techniques of this disclosure. The abscissa axes of FIG. 7 represent time and the ordinate axis of FIG. 7 represents first adapted switching signal 710, second adapted switching signal 712, third adapted switching signal 714, and shunt current 730. First switching period 736 includes portion 702 ($T_{La}$) and portion 704 ($T_{Ra}$).

In the example of FIG. 7, controller 102 may determine adapted switching signals 710-714 based on switching signals 510-514 of FIG. 5. For example, each one of first adapted switching signal 710 and second adapted switching signal 712 may be turned-on during portion 702 ($T_{La}$), which is extended from portion 502 ($T_L$) of FIG. 5 by time value 726. First switching signal 712 may be further turned-on during portion 704 ($T_{Ra}$), which is extended from portion 504 ($T_R$) of FIG. 5 by time value 728. Second switching signal 714 may be turned-off during portion 704 ($T_{Ra}$). Third switching signal 714 may be turned-off during first switching period 736. Time value 728 may be equal to time value 726.

FIG. 8 is a conceptual timing diagram illustrating an example of a first adapted switching signal 710, a second adapted switching signal 712, and a third adapted switching signal 74 during a second switching period 738 that has been adapted over two switching periods, in accordance with one or more techniques of this disclosure.

During second switching period 738, second adapted switching signal 712 may be compensated to be turned-on during compensated portion 740. In this example, third adapted switching signal 714 may be turned-on during first compensated portion 706 and a second compensated portion 708. First compensated portion 706 may extend a time value corresponding to (e.g., equal to) time value 726 and/or time value 728. Similarly, second compensated portion 708 may extend a time value corresponding to (e.g., equal to) time value 726 and/or time value 728. The combination of first compensated portion 706 and second compensated portion 708 may form a third portion 707 of second switching period 738 that indicates to turn-on third switching signal 714 and turn-off both first adapted switching signal 710 and second adapted switching signal 712. Third portion 707 may correspond to a summation of first time value 726 and second-time value 728. First switching signal 710 and second switching signal 712 may be turned-off during third portion 707.

For example, controller 102 may determine that first portion 502 (e.g., $T_L$) of FIG. 5 is too small and generate first adapted switching signal 710 with an adapted first portion 702 (e.g., $T_{La}$) that is adapted to a maximum measurement window ($T_{max}$). In this example, controller 102 may determine that second portion 504 (e.g., $T_R$) of FIG. 5 is too small and generate first adapted switching signal 710 with an adapted second portion 704 (e.g., $T_{Ra}$) that is adapted to the maximum measurement window (Tmax). In this example, controller 102 may perform a current measurement during adapted first portion 702 (e.g., $T_{La}$) and during adapted second portion 704 (e.g., $T_{Ra}$). During second switching period 738, $T_{La}$-$T_L$ and $T_{Ra}$-$T_R$ are compensated. During second switching period 738, controller 102 may not take a current measurement. Using more than one switching period (e.g., two switching periods) for measurement window adaptation may have advantage compared to using a single PWM cycle. For example, $T_{max}$ increases to $T_{max}$=2×3.35 µs=6.7 µs because compensation and measurement window adaptation may be performed in in two PWM cycles. For instance, controller 102 may perform measurement window adaptation in first switching period 736 and perform compensation in second switching period 738.

Figure 9:
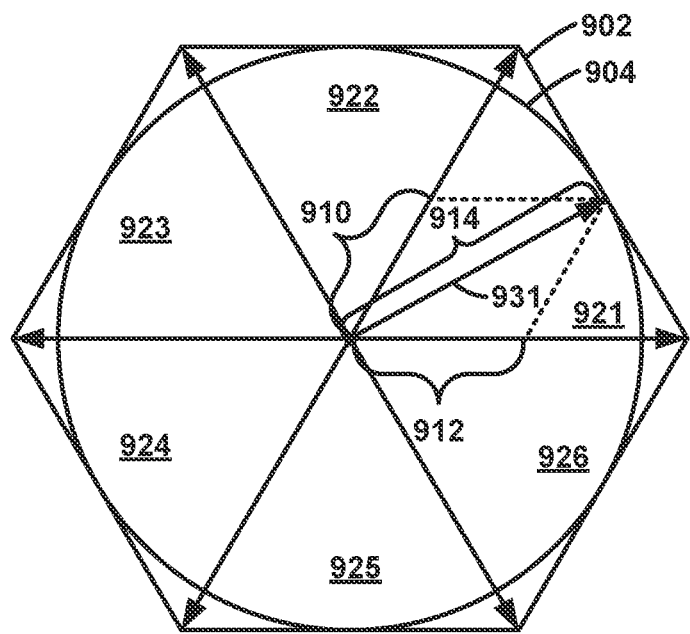
FIG. 9 is a conceptual vector control diagram illustrating phase voltages for a 3-phase system, in accordance with one or more techniques of this disclosure.

FIG. 9 is a conceptual vector control diagram, illustrating phase voltages for a 3-phase system (e.g., a motor based on the field orientation of a rotor of motor 106), in accordance with one or more techniques of this disclosure. In the example of FIG. 9, switching states form base voltage space vectors. For example, base voltage space vectors span the voltage source inverter control hexagon containing sectors 921-926. Rotating voltage space vector U 931 applied with switching time on period time scaled results in voltage space vector $$\frac{T_L}{T_P} \underline{U}_L \; 910$$

and right side voltage space vector $$\frac{T_R}{T_P} \underline{U}_R \; 912.$$

The example of FIG. 9 may include a maximum measurement window based on a maximum amplitude base voltage space vector of ⅔ $U_{dc}$, a maximum amplitude applied voltage space vector: 1/√3 $U_{dc}$, a ratio: (1/√3)/(⅔) =0.866. As such, at a switching frequency of 20 kHz, the maximum measurement window may be 6.7 µs for adaption and compensation (e.g., a single PWM cycle) with a $T_{max}$=3.35 µs. At a switching frequency of 10 kHz, the maximum measurement window may be 13.4 µs for adaption and compensation (e.g., a single PWM cycle) with a $T_{max}$=6.7 µs.

The control range of a voltage source inverter for a three phase BLDC motor is defined by a hexagonal control area 902 that contains sectors 921-926 and an inner control circle 904. In some examples, the control diagram illustrated in FIG. 9 is used to calculate the voltage applied to the phase currents from a DC voltage source. The rotations phase vector 914 illustrates that two thirds of the supply voltage may be applied.

Figure 10:
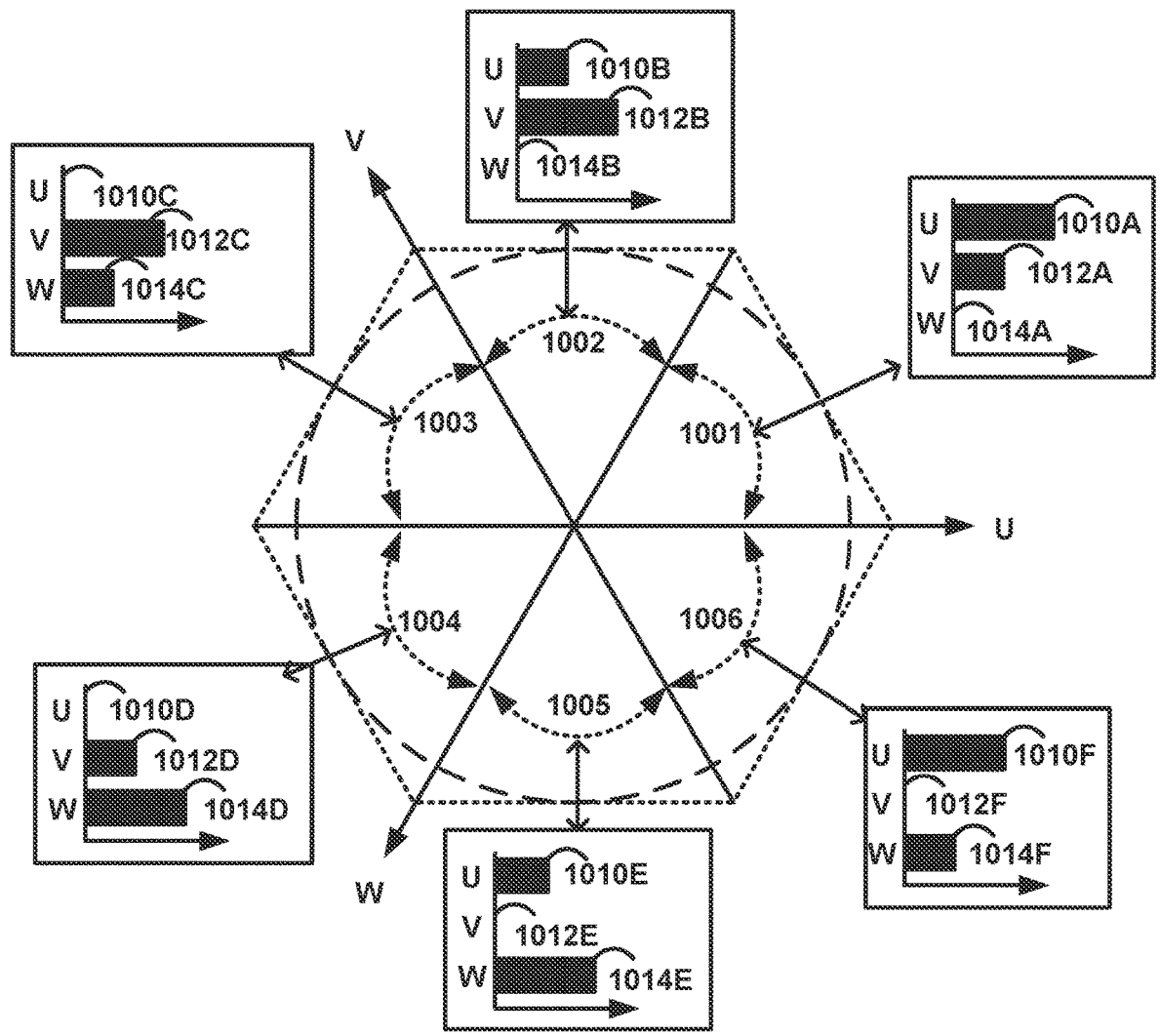
FIG. 10 is a conceptual vector control diagram illustrating an assignment of a first switching signal, a second switching signal, and a third switching signal, based on the orientation of the rotor, in accordance with one or more techniques of this disclosure.

FIG. 10 is a conceptual vector control diagram, illustrating signal states based on a field orientation of a rotor of motor 106. The field orientation of the rotor is divided into sections 1001, 1002, 1003, 1004, 1005, and 1006. Section 1001 assigns first switching signal 1010A, second switching signal 1012A, and third switching signal 1014A to control the current in a "U" phase winding, a "V" phase winding, and a "W" phase winding, respectively. Similarly, section 1002 assigns first switching signal 1010B, second switching signal 1012B, and third switching signal 1014B to control the current in a "U" phase winding, a "V" phase winding, and a "W" phase winding, respectively. Section 1003 assigns first switching signal 1010C, second switching signal 1012C, and third switching signal 1014C to control the current in a "U" phase winding, a "V" phase winding, and a "W" phase winding, respectively and section 1004 assigns first switching signal 1010D, second switching signal 1012D, and third switching signal 1014D to control the current in a "U" phase winding, a "V" phase winding, and a "W" phase winding, respectively. Further, section 1005 assigns first switching signal 1010E, second switching signal 1012E, and third switching signal 1014E to control the current in a "U" phase winding, a "V" phase winding, and a "W" phase winding, respectively and section 1006 assigns first switching signal 1010F, second switching signal 1012F, and third switching signal 1014F to control the current in a "U" phase winding, a "V" phase winding, and a "W" phase winding, respectively.

Controller 102 may assign switching signals to a sector depending on a maximum, middle, and minimum PWM output. For example, controller 102 may assign $PWM_{Max}$, $PWM_{Mid}$, and $PWM_{Min}$ as shown in Table 1. Using $PWM_{Max}$, $PWM_{Mid}$, and $PWM_{Min}$, may allow controller 102 to reduce maintenance and memory effort for measurement window adaptation, which may help to allow for cost sensitive applications.

TABLE 1

| Sector | $PWM_{Max}$ | $PWM_{Mid}$ | $PWM_{Min}$ |
| --- | --- | --- | --- |
| 1 | Phase U | Phase V | Phase W |
| 2 | Phase V | Phase U | Phase W |
| 3 | Phase V | Phase W | Phase U |
| 4 | Phase W | Phase V | Phase U |
| 5 | Phase W | Phase U | Phase V |
| 6 | Phase U | Phase W | Phase V |

In some examples the rotor orientation in the stator winding field orientations, determines the state for which to assign a particular set of voltage switching signals to a particular set of switching controlling the phase current in a "U" phase winding, a "V" phase winding, and a "W" phase winding of the motor stator.

Figure 11:
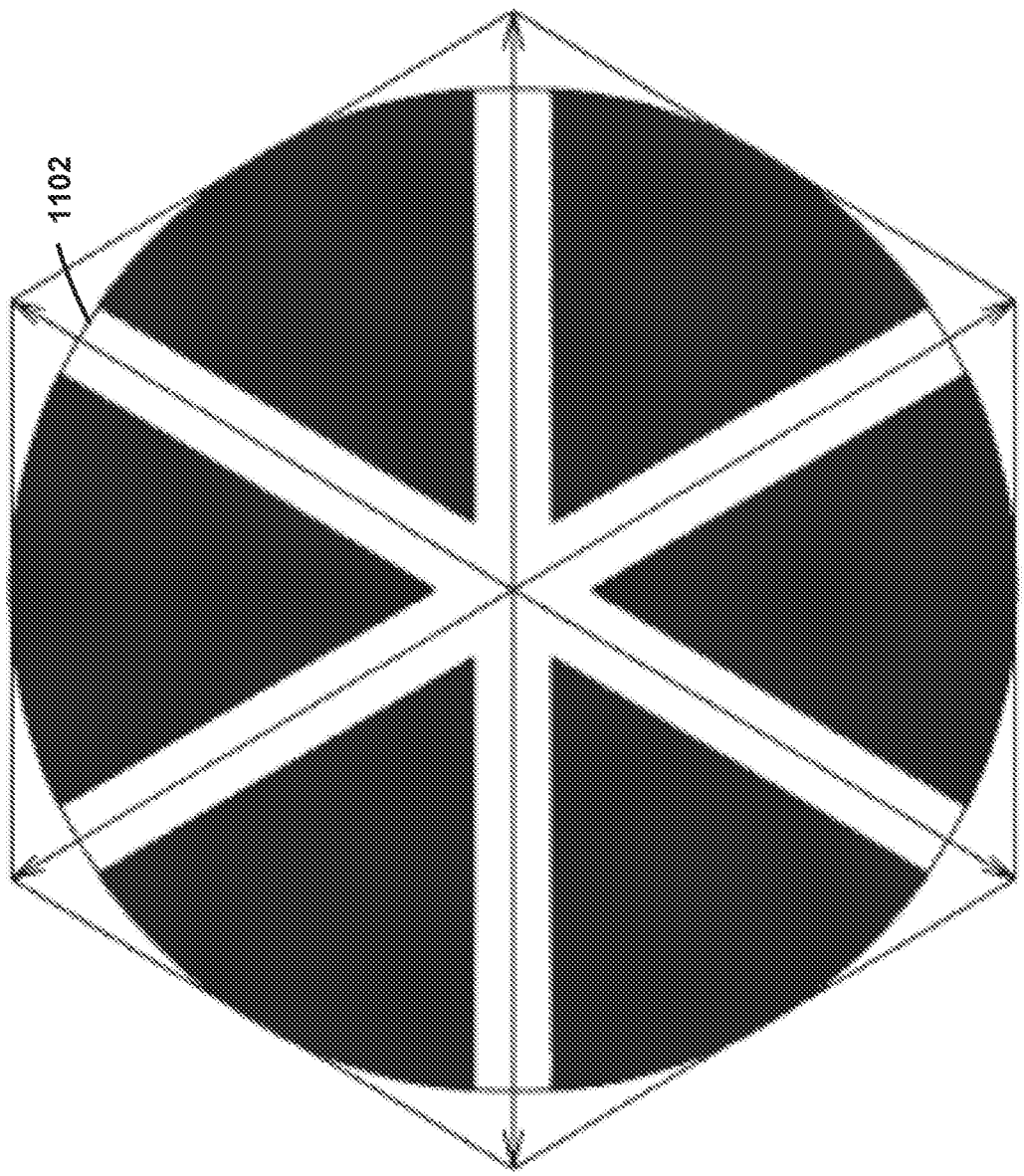
FIG. 11 is a conceptual first control diagram illustrating regions of stable operation, in accordance with one or more techniques of this disclosure.

FIG. 11 is a conceptual control diagram illustrating regions of operation that could be measured with a single shunt measurement circuit, in accordance with one or more techniques of the disclosure. FIG. 11 illustrates a polar plot of a control diagram of a measurement of a voltage response based on orientation and supply voltage. As supply voltage increases the point of operation moves to the outside of the circle. As the rotor rotates one moves orbitally around the center of the plot.

Illustrated in FIG. 11, a rotating voltage space vector can be generated by a switching signal (e.g., a PWM pattern) in which a single shunt current measurement is not always possible without any adaption. In this example, the measurement of one or even two currents in one switching period may not be feasible. FIG. 11 shows areas 1102 of the inner control circle where an adaption of the measurement window is needed but feasible considering a maximum measurement time window. This time window may result from an assumption that in control areas with high modulation output, for a rotating voltage space vector, only one current measurement window adaption is needed and calculates as followed. The maximum voltage output of a 3-phase voltage source inverter is limited to ⅔ Udc within one PWM period. That corresponds to a rotating voltage space vector following the perimeter of the control hexagon. Sinusoidal motor control uses injected voltage space vectors with a maximum amplitude of 1/sqrt(3) Udc. That corresponds to a rotating voltage space vector following to the radius of the inner circle of the control hexagon. The resulting difference scaled to a PWM period of 50 us leads to a remaining control time of 6.698 μs for measurement window adaption and compensation. This results in a maximum measurement time window of 3.349 μs.

Figure 12:
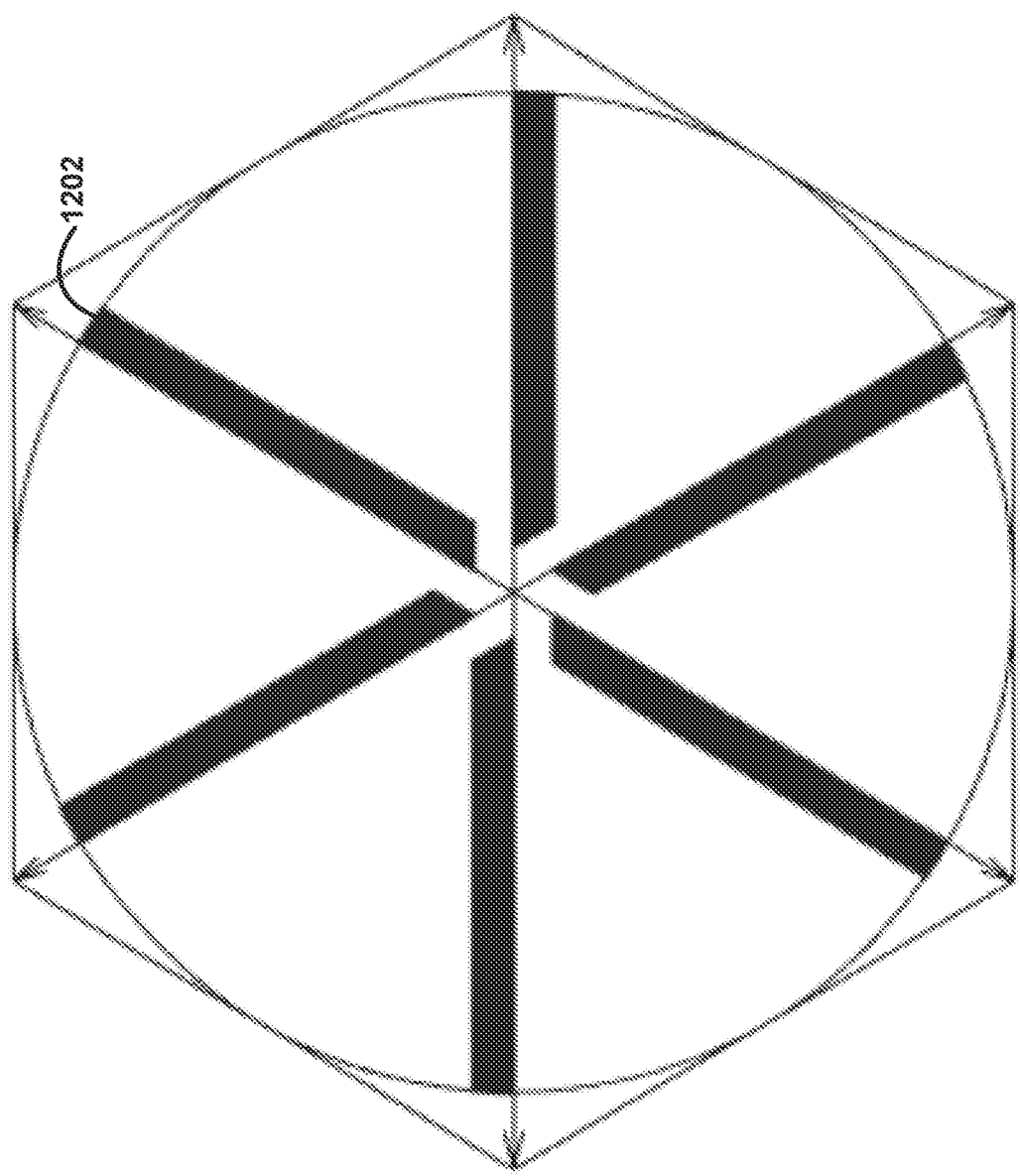
FIG. 12 is a conceptual second control diagram illustrating regions of stable operation, in accordance with one or more techniques of this disclosure.

FIG. 12 is a conceptual second control diagram illustrating regions of stable operation, in accordance with one or more techniques of this disclosure. FIG. 12 illustrates a polar plot of the rotational orientations 1202 of a rotor of a motor 106 where a voltage measurement of a voltage response may be accurate. In the example of FIG. 12, a measurement window of the left side voltage space vector is too small. As such, controller 102 may apply one measurement window adaptation.

Figure 13:
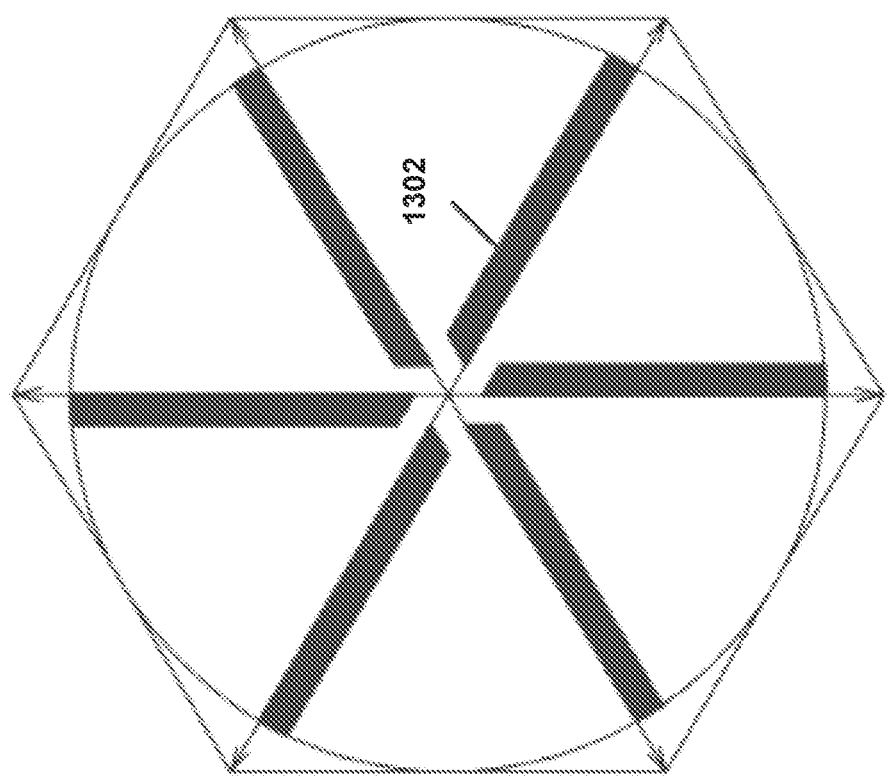
FIG. 13 is a conceptual third control diagram illustrating regions of stable operation, in accordance with one or more techniques of this disclosure.

FIG. 13 is a conceptual third control diagram illustrating regions of stable operation, in accordance with one or more techniques of this disclosure. FIG. 13 illustrates a polar plot of the rotational orientations 1302 of a rotor of a motor 106 where a voltage measurement of a voltage response may be accurate. In the example of FIG. 13, a measurement window of the right side voltage space vector is too small. As such, controller 102 may apply one measurement window adaptation.

Figure 14:
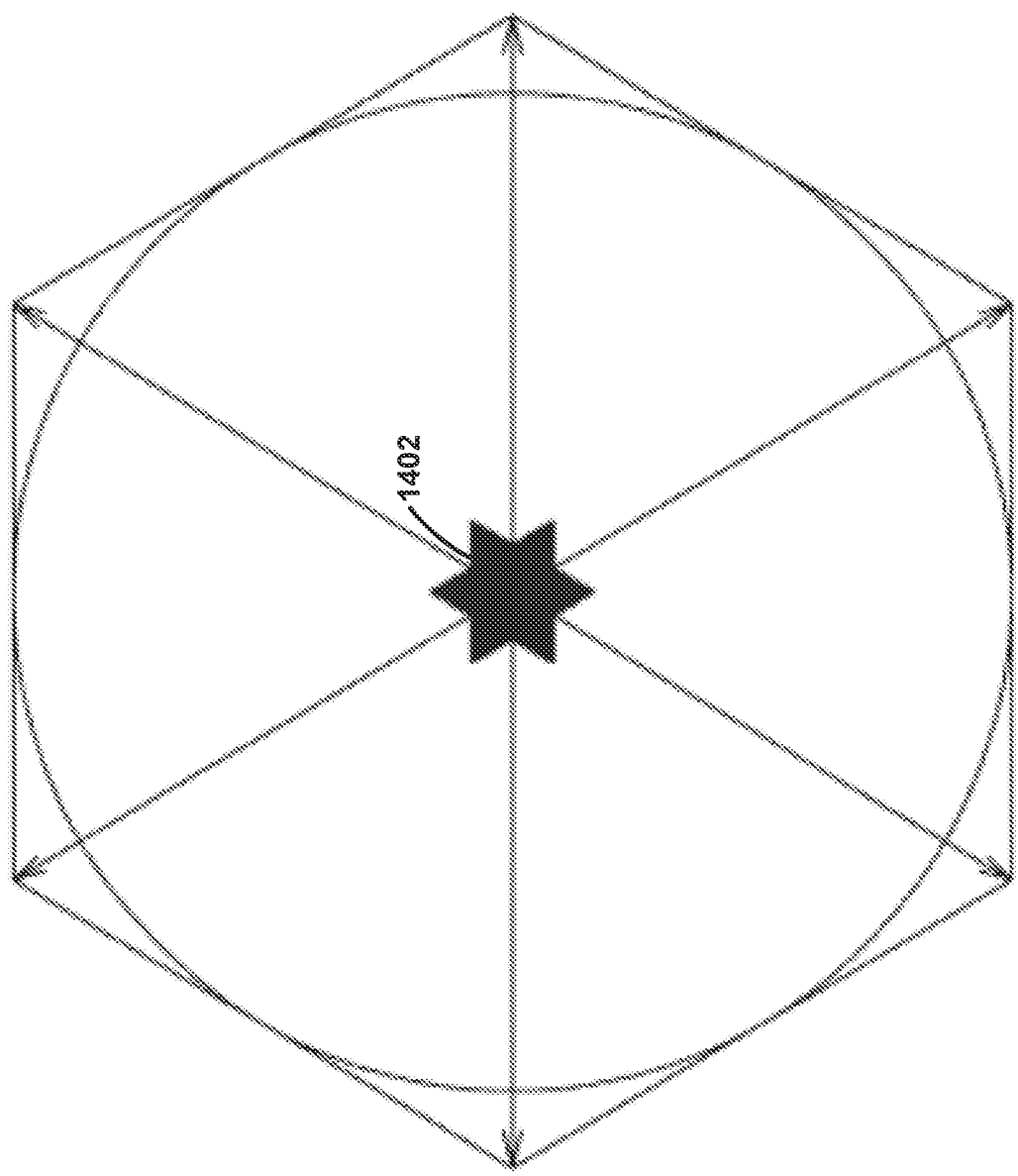
FIG. 14 is a conceptual fourth control diagram illustrating regions of stable operation, in accordance with one or more techniques of this disclosure.

FIG. 14 is a conceptual fourth control diagram illustrating regions of stable operation, in accordance with one or more techniques of this disclosure. FIG. 14 illustrates a polar plot of the rotational orientations 1402 of a rotor of a motor 106 where a voltage measurement of a voltage response may be accurate. In the example of FIG. 14, a measurement window of the both the left and right side voltage space vectors are too small. As such, controller 102 may apply two measurement window adaptations. In this way, a maximum measurement window assumption may result in 100% feasibility of measurement window adaptation that may be independent of the phase and amplitude of an applied voltage space vector.

Figure 15:
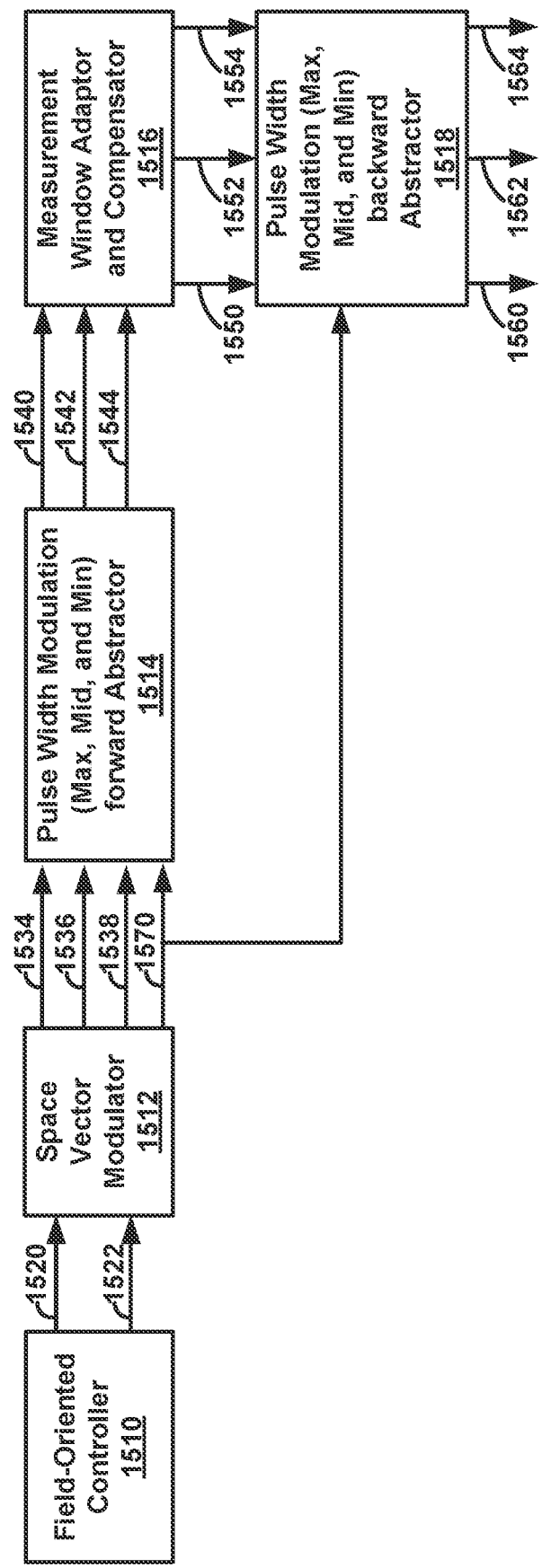
FIG. 15 is a block diagram illustrating an a process for generating adapted switching signals, in accordance with one or more techniques of this disclosure.

FIG. 15 is a block diagram illustrating an a process for generating adapted switching signals, in accordance with one or more techniques of this disclosure. In some examples of FIG. 15 a field-oriented controller 1510 may calculate voltage signals $U_d$ 1520 and $U_q$ 1522. Space vector modulator 1512 may calculate $PWM_u$ signal 1534, $PWM_v$ signal 1536, and PWM w signal 1538 using signals $U_d$ 1520 and $U_q$ 1522. $PWM_u$ signal 1534 may represent a switching signal for phase U ($PWM_u$), $PWM_v$ signal 1536 may represent a switching signal for phase V ($PWM_V$), and $PWM_w$ signal 1538 may represent a switching signal for phase W ($PWM_W$). Additionally, space vector modulator 1512 may produce a sector selection signal 1570 (e.g., an indication of an integer between one and six, inclusive). Sector selection signal 1570 may indicate the rotational orientation of a rotor in motor 106. Space vector modulator 1512 may output sector selection signal 1570 to pulse width modulation backward abstractor 1518.

Pulse width modulation forward abstractor 1514 may perform forward abstraction. For example, pulse width modulation forward abstractor 1514 may generate preselected duty cycle signal 1540 (PWM max), preselected duty cycle signal 1542 ($PWM_{mid}$), preselected duty cycle signal 1544 ($PWM_{max}$) using $PWM_u$ signal 1534, $PWM_v$ signal 1536, $PWM_w$ signal 1538, and sector selection signal 1570. Pulse width modulation forward abstractor 1514 may associate a preselected small duty cycle value with an input signal having a smallest duty cycle of $PWM_u$ signal 1534, $PWM_v$ signal 1536, and $PWM_w$ signal 1538. Similarly, pulse width modulation forward abstractor 1514 may associate a preselected middle duty cycle value with an input signal having a middle duty cycle of $PWM_u$ signal 1534, $PWM_v$ signal 1536, and $PWM_w$ signal 1538. Pulse width modulation forward abstractor 1514 may associate a preselected large duty cycle value with an input signal having the largest duty cycle of $PWM_u$ signal 1534, $PWM_v$ signal 1536, and $PWM_w$ signal 1538. In some examples, $PWM_u$ signal 1534, $PWM_v$ signal 1536, and $PWM_w$ signal 1538 may represent first switching signal 510, second switching signal 512, and third switching signal 514 of FIG. 5.

Measurement window adaptor and compensator 1516 may apply adaptations to the switching signals according to one or more techniques described in the disclosure (see FIGS. 6-8). Measurement window adaptor and compensator 1516 may output adapted switching signal 1550 (e.g., $PWM_{maxa}$), adapted switching signal 1552 (e.g., $PWM_{mida}$), and adapted switching signal 1554 (e.g., $PWM_{mina}$) to pulse width modulation backward abstractor 1518.

Backward abstractor 1518 determines adapted switching signal 1560 (e.g., $PWM_{Ua}$), adapted switching signal 1562 (e.g., $PWM_{Va}$), and adapted switching signal 1564 (e.g., $PWM_{Wa}$) using adapted switching signal 1550 (e.g., $PWM_{maxa}$), adapted switching signal 1552 (e.g., $PWM_{mida}$), and adapted switching signal 1554 (e.g., $PWM_{mina}$) along with the sector selection signal 1570. For example, backward abstractor 1518 assigns adapted switching signal 1560 (e.g., $PWM_{Wa}$), adapted switching signal 1562 (e.g., $PWM_{Va}$), and adapted switching signal 1564 (e.g., $PWM_{Wa}$) to the appropriate switching element(s) to control the assigned phase currents of motor 106, according to one or more techniques of the disclosure.

Figure 16:
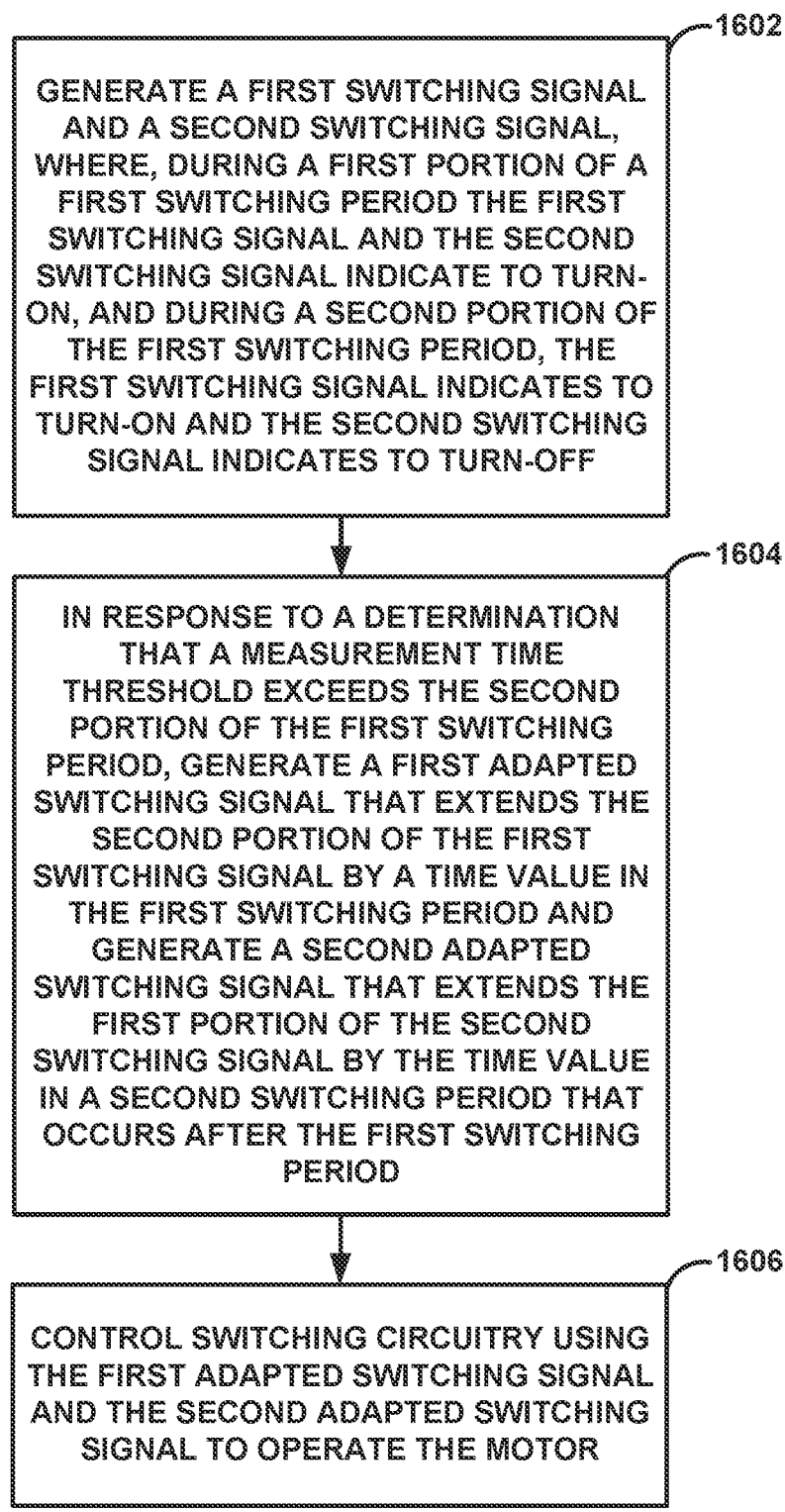
FIG. 16 is a flowchart illustrating an example process, in accordance with one or more techniques of the disclosure.

FIG. 16 is a flowchart illustrating an example of operating a motor 106 using adapted switching signals in accordance with one or more techniques of the disclosure. FIG. 16 is discussed with FIGS. 1-15 for example purposes only.

Switching signal generator 120 of controller 102 may generate first switching signal 130 and second switching signal 132. In some examples, during first portion 502 of first switching period 506, first switching signal 510 and second switching signal 512 may indicate to turn-on. During a second portion 504 of first switching period 506, first switching signal 510 indicates to turn-on and second switching signal 512 indicates to turn-off (1602). First switching signal 130 and second switching signal 132 may be edge aligned pulse width modulated signals (see FIG. 3). In some examples, controller 102 may be configured to generate first switching signal 130 and second switching signal 132 using field-oriented control (see FOC controller 1510 of FIG. 15).

In response to a determination that a measurement time threshold exceeds second portion 504 of first switching period 506, adaptation circuitry 122 of controller 102 may generate a first adapted switching signal 710 that extends second portion 704 by a time value 726 in first switching period 736 and generate a second adapted switching signal 712 that extends first portion 702 by time value 726 in second switching period 738 that occurs after the first switching period (1604).

For example, controller 102 may determine that a first measurement time threshold exceeds second portion 504 of first switching period 506. In this example, controller 102 may be configured to extend first portion 702 of first switching period 736 by a second time value 728 in first switching period 736 in response to a determination that a second measurement time threshold exceeds first portion 502 of first switching period 506. Controller 102 may be configured to extend first portion 702 by second time value 728 in first switching period 736 in response to a determination that the second measurement time threshold exceeds first portion 502 of first switching period 506. In some examples, the first measurement time threshold may correspond (e.g., may be equal to) to the second measurement time threshold. The first time value may correspond to the second time value. ADC 432 may be configured to generate a current sample during first portion 702. In some examples, the measurement time threshold may not be less than a summation of a sample time of ADC 432 and a settling time for current at motor 106.

In some examples, controller 102 may be configured to generate a third switching signal 514 to indicate to turn-off during first switching period 506. In this example, controller 102 may generate a third adapted switching signal 714 that adds a third portion 707 of second switching period 738 that indicates to turn-on third adapted switching signal 714 and turn-off both the first adapted switching signal 710 and second adapted switching signal 712. Third portion 707 may correspond to a summation of first time value 726 and second-time value 728.

Controller 102 may control switching circuitry 104 using first adapted switching signal 134 and second adapted switching signal 136 to operate the motor 106 (1606). For example, controller 102 may output first adapted switching signal 134 and second adapted switching signal 136 to control switching elements 420A-420F.

The following examples may illustrate one or more aspects of the disclosure.

Clause 1: A circuit for controlling a motor, the circuit being configured to: generate a first switching signal and a second switching signal, wherein, during a first portion of a first switching period, both the first switching signal and the second switching signal indicate to turn-on and, during a second portion of the first switching period, the first switching signal indicates to turn-on and the second switching signal indicates to turn-off; in response to a determination that a measurement time threshold exceeds the second portion of the first switching period, generate a first adapted switching signal that extends the second portion of the first switching signal by a time value in the first switching period and generating a second adapted switching signal that extends the first portion of the second switching signal by the time value in a second switching period that occurs after the first switching period; and control switching circuitry using the first adapted switching signal and the second adapted switching signal to operate the motor.

Clause 2: The circuit of clause 1, wherein the measurement time threshold is a first measurement time threshold and wherein the time value is a first time value; wherein, to generate the first adapted switching signal, the circuit is configured to extend the first portion of the first switching period by a second time value in the first switching period in response to a determination that a second measurement time threshold exceeds the first portion of the first switching period; and wherein, to generate the second adapted switching signal, the circuit is configured to extend the first portion by the second time value in the first switching period in response to a determination that the second measurement time threshold exceeds the first portion of the first switching period.

Clause 3: The circuit of clause 2, wherein the first measurement time threshold corresponds to the second measurement time threshold.

Clause 4: The circuit of clauses 2-3, wherein the first time value corresponds to the second time value.

Clause 5: The circuit of clauses 2-4, wherein the circuit is configured to: generate a third switching signal to indicate to turn-off during the first switching period; and generate a third adapted switching signal that adds a third portion of the second switching period that indicates to turn-on the third adapted switching signal and turn-off both the first adapted switching signal and the adapted second switching signal.

Clause 6: The circuit of clause 5, wherein the third portion corresponds to a summation of the first time value and the second time value.

Clause 7: The circuit of clauses 1-6, further comprising, an analog-to-digital converter configured to generate a current sample during the first portion, wherein the measurement time threshold is not less than a summation of a sample time of the analog-to-digital converter and a settling time for current at the motor.

Clause 8: The circuit of clauses 1-7, wherein the first switching signal and the second switching signal are edge aligned pulse width modulated signals.

Clause 9: The circuit of clauses 1-8, wherein the circuit is configured to generate the first switching signal and the second switching signal using field-oriented control.

Clause 10: A method for controlling a motor, the method comprising: generating a first switching signal and a second switching signal, wherein, during a first portion of a first switching period the first switching signal and the second switching signal indicate to turn-on, and during a second portion of the first switching period, the first switching signal indicates to turn-on and the second switching signal indicates to turn-off;—in response to determining that a measurement time threshold exceeds the second portion of the first switching period, generating a first adapted switching signal that extends the second portion of the first switching signal by a time value in the first switching period and generating a second adapted switching signal that extends the first portion of the second switching signal by the time value in a second switching period that occurs after the first switching period; and—controlling switching circuitry using the first adapted switching signal and the second adapted switching signal to operate the motor.

Clause 11: The method of clause 10, wherein the measurement time threshold is a first measurement time threshold and wherein the time value is a first time value; wherein generating the first adapted switching signal further comprises extending the first portion of the first switching period by a second time value in the first switching period in response to determining that a second measurement time threshold exceeds the first portion of the first switching period; and wherein generating the second adapted switching signal further comprises extending the first portion by the second time value in the first switching period in response to determining that the second measurement time threshold exceeds the first portion of the first switching period.

Clause 12: The method of clause 11, wherein the first measurement time threshold corresponds to the second measurement time threshold.

Clause 13: The method of clauses 11-12, wherein the first time value corresponds to the second time value.

Clause 14: The method of clauses 11-13, further comprising: generating a third switching signal to indicate to turn-off during the first switching period; and generating a third adapted switching signal that adds, during the second switching period, a third portion of the first switching period that indicates to turn-on the third switching signal and turn-off both the first switching signal and the second switching signal.

Clause 15: The method of clause 14, wherein the third portion corresponds to a summation of the first time value and the second time value.

Clause 16: The method of clauses 10-15, further comprising: generating, using an analog-to-digital converter, a current sample during the second portion, wherein the measurement time threshold is not less than a summation of a sample time of the analog-to-digital converter and a settling time for current at the motor.

Clause 17: The method of clauses 10-16, wherein the first switching signal and the second switching signal are edge aligned pulse width modulated signals.

Clause 18: The method of clauses 10-17, wherein generating the first switching signal and the second switching signal comprises using field-oriented control.

Clause 19: A system comprising:—switching circuitry; and—a controller implemented in circuitry and configured to:—generate a first switching signal and a second switching signal, wherein, during a first portion of a first switching period, both the first switching signal and the second switching signal indicate to turn-on and, during a second portion of the first switching period, the first switching signal indicates to turn-on and the second switching signal indicates to turn-off; in response to a determination that a measurement time threshold exceeds the second portion of the first switching period, generate a first adapted switching signal that extends the second portion of the first switching signal by a time value in the first switching period and generating a second adapted switching signal that extends the first portion of the second switching signal by the time value in a second switching period that occurs after the first switching period; and—control switching circuitry using the first adapted switching signal and the second adapted switching signal to operate the motor.

Clause 20: The system of clause 19, further comprising the motor.

Various aspects have been described in the disclosure. These and other aspects are within the scope of the following claims.

What is claimed is:

1. A circuit for controlling a motor, the circuit being configured to:
   generate a first switching signal and a second switching signal, wherein, during a first portion of a first switching period, both the first switching signal and the second switching signal indicate to turn-on and, during a second portion of the first switching period, the first switching signal indicates to turn-on and the second switching signal indicates to turn-off;
   in response to a determination that a measurement time threshold exceeds the second portion of the first switching period, generate a first adapted switching signal that extends the second portion of the first switching signal by a time value in the first switching period and generating a second adapted switching signal that extends the first portion of the second switching signal by the time value in a second switching period that occurs after the first switching period; and
   control switching circuitry using the first adapted switching signal and the second adapted switching signal to operate the motor.

2. The circuit of claim 1,
   wherein the measurement time threshold is a first measurement time threshold and wherein the time value is a first time value;
   wherein, to generate the first adapted switching signal, the circuit is configured to extend the first portion of the first switching period by a second time value in the first switching period in response to a determination that a second measurement time threshold exceeds the first portion of the first switching period; and wherein, to generate the second adapted switching signal, the circuit is configured to extend the first portion by the second time value in the first switching period in response to a determination that the second measurement time threshold exceeds the first portion of the first switching period.

3. The circuit of claim 2, wherein the first measurement time threshold corresponds to the second measurement time threshold.

4. The circuit of claim 2, wherein the first time value corresponds to the second time value.

5. The circuit of claim 2, wherein the circuit is configured to:
generate a third switching signal to indicate to turn-off during the first switching period; and
generate a third adapted switching signal that adds a third portion of the second switching period that indicates to turn-on the third adapted switching signal and turn-off both the first adapted switching signal and the second adapted switching signal.

6. The circuit of claim 5, wherein the third portion corresponds to a summation of the first time value and the second time value.

7. The circuit of claim 1, further comprising, an analog-to-digital converter configured to generate a current sample during the first portion, wherein the measurement time threshold is not less than a summation of a sample time of the analog-to-digital converter and a settling time for current at the motor.

8. The circuit of claim 1, wherein the first switching signal and the second switching signal are edge aligned pulse width modulated signals.

9. The circuit of claim 1, wherein the circuit is configured to generate the first switching signal and the second switching signal using field-oriented control.

10. A method for controlling a motor, the method comprising:
generating a first switching signal and a second switching signal, wherein, during a first portion of a first switching period the first switching signal and the second switching signal indicate to turn-on, and during a second portion of the first switching period, the first switching signal indicates to turn-on and the second switching signal indicates to turn-off;
in response to determining that a measurement time threshold exceeds the second portion of the first switching period, generating a first adapted switching signal that extends the second portion of the first switching signal by a time value in the first switching period and generating a second adapted switching signal that extends the first portion of the second switching signal by the time value in a second switching period that occurs after the first switching period; and
controlling switching circuitry using the first adapted switching signal and the second adapted switching signal to operate the motor.

11. The method of claim 10,
wherein the measurement time threshold is a first measurement time threshold and wherein the time value is a first time value;
wherein generating the first adapted switching signal further comprises extending the first portion of the first switching period by a second time value in the first switching period in response to determining that a second measurement time threshold exceeds the first portion of the first switching period; and
wherein generating the second adapted switching signal further comprises extending the first portion by the second time value in the first switching period in response to determining that the second measurement time threshold exceeds the first portion of the first switching period.

12. The method of claim 11, wherein the first measurement time threshold corresponds to the second measurement time threshold.

13. The method of claim 11, wherein the first time value corresponds to the second time value.

14. The method of claim 11, further comprising:
generating a third switching signal to indicate to turn-off during the first switching period; and
generating a third adapted switching signal that adds, during the second switching period, a third portion of the first switching period that indicates to turn-on the third switching signal and turn-off both the first switching signal and the second switching signal.

15. The method of claim 14, wherein the third portion corresponds to a summation of the first time value and the second time value.

16. The method of claim 10, further comprising:
generating, using an analog-to-digital converter, a current sample during the second portion, wherein the measurement time threshold is not less than a summation of a sample time of the analog-to-digital converter and a settling time for current at the motor.

17. The method of claim 10, wherein the first switching signal and the second switching signal are edge aligned pulse width modulated signals.

18. The method of claim 10, wherein generating the first switching signal and the second switching signal comprises using field-oriented control.

19. A system comprising:
switching circuitry; and
a controller implemented in circuitry and configured to:
generate a first switching signal and a second switching signal, wherein, during a first portion of a first switching period, both the first switching signal and the second switching signal indicate to turn-on and, during a second portion of the first switching period, the first switching signal indicates to turn-on and the second switching signal indicates to turn-off;
in response to a determination that a measurement time threshold exceeds the second portion of the first switching period, generate a first adapted switching signal that extends the second portion of the first switching signal by a time value in the first switching period and generating a second adapted switching signal that extends the first portion of the second switching signal by the time value in a second switching period that occurs after the first switching period; and
control switching circuitry using the first adapted switching signal and the second adapted switching signal to operate the motor.

20. The system of claim 19, further comprising the motor.

* * * * *